Jan. 27, 1970    R. D. MOAN    3,491,621
FOUR SPEED-RATIO AUTOMOTIVE VEHICLE DRIVELINE
Filed March 14, 1968    3 Sheets-Sheet 1

INVENTOR:
Richard D. Moan
BY
ATTORNEYS

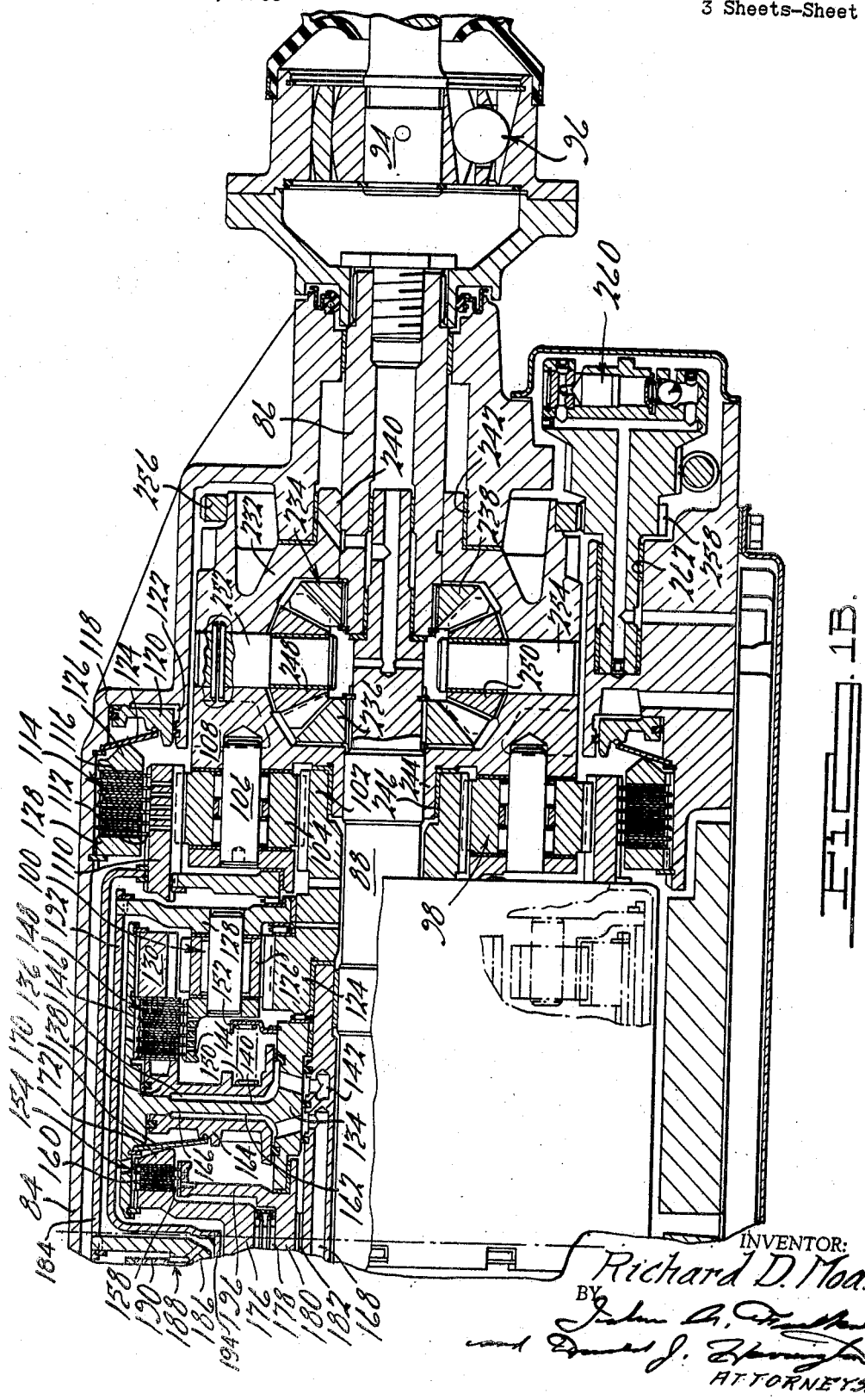

Jan. 27, 1970   R. D. MOAN   3,491,621
FOUR SPEED-RATIO AUTOMOTIVE VEHICLE DRIVELINE
Filed March 14, 1968   3 Sheets-Sheet 3
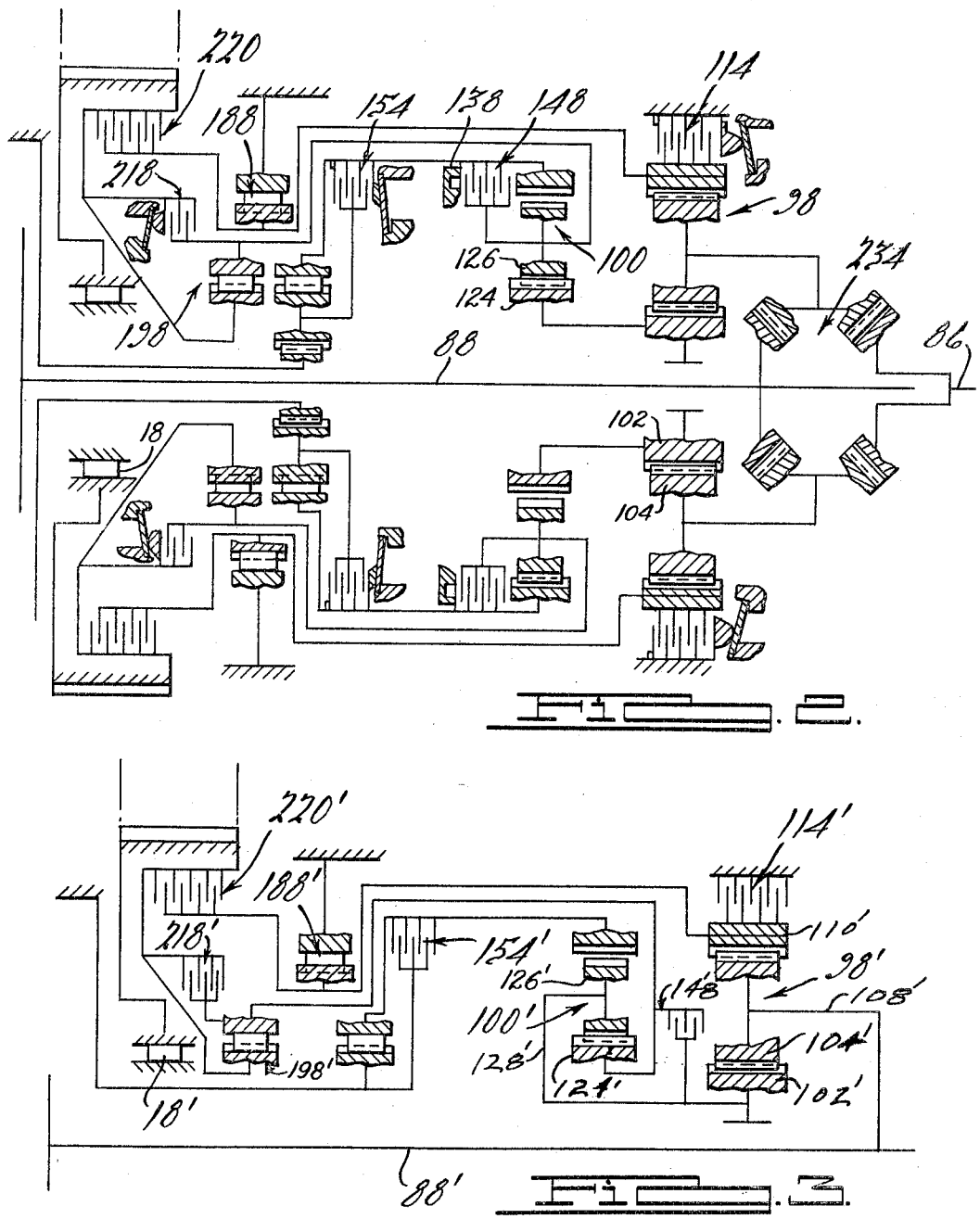
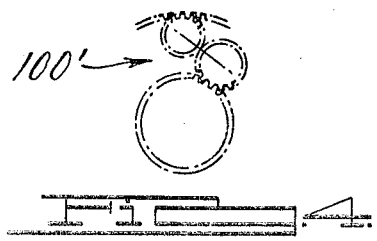
INVENTOR:
Richard D. Moan
BY
ATTORNEYS United States Patent Office 3,491,621
Patented Jan. 27, 1970

3,491,621
FOUR SPEED-RATIO AUTOMOTIVE VEHICLE DRIVELINE
Richard D. Moan, Livonia, Mich., assignor to Ford Motor Company, Dearborn, Mich., a corporation of Delaware
Filed Mar. 14, 1968, Ser. No. 713,126
Int. Cl. F16h 57/10
U.S. Cl. 74—759                                     16 Claims

ABSTRACT OF THE DISCLOSURE

A planetary gear system having gear elements capable of establishing four forward-driving speed ratios with uniform ratio steps that are of sufficient range for an automotive vehicle driveline, wherein the relative motion of the gear elements of the gearing is controlled by friction clutches and brakes that are fewer in number than the number of friction elements required in four speed-ratio drivelines of known design, and wherein the elements of the gearing are arranged strategically to make it possible to employ a simplified clutch-and-brake engagement-and-release pattern during ratio changes, thereby eliminating control problems normally associated with clutch-and-brake timing.

GENERAL DESCRIPTION OF THE INVENTION

A principal embodiment of my invention comprises an engine with a crankshaft situated transversely with respect to the centerline of the vehicle and power output shafts situated for rotation about the output shaft axis. The power input element of the gearing is connected drivably through a chain drive mechanism to the turbine of a hydrokinetic torque converter. The torque converter includes an impeller that is connected drivably to the vehicle engine.

Disc-type friction elements, five in number, are used in combination with planetary gear units to establish four forward-driving speed ratios and a single reverse ratio. The gear units comprise a simple planetary gear unit and a compound planetary gear unit, the latter being a reversing gear set used in combination with the simple planetary gearing to establish split torque delivery paths. Provision is made for changing ratios by engaging and disengaging in proper sequence the clutches and the brakes. This does not present a control problem as in other driveline installations with four speed-ratios, because the timing of the engagement and release of the clutches and brakes is not critical.

The output torque delivery element of the gearing is the carrier for the simple planetary gear unit. This drives the ring gear of a differential gear unit, the side gears of the differential gear unit being connected drivably to each of two power output shafts. The output shafts extend co-axially with respect to the gearing and in parallel disposition with respect to the crankshaft axis. By means of suitable universal joints, the output shafts are connected to their respective axle shafts for the traction wheels.

BRIEF DESCRIPTION OF THE VIEWS OF THE DRAWING

FIGURE 1B shows in longitudinal cross-sectional form the planetary gearing of the driveline. The power input element of the FIGURE 1B construction is connected drivably to the power output element of the FIGURE 1A construction by means of a drive chain.

FIGURE 2 is a schematic diagram of the gearing arrangement shown in FIGURE 1B.

FIGURE 3 is a second embodiment of a gearing arrangement that might be used in lieu of the arrangement in FIGURES 1B and 2.

FIGURE 4 is a diagram of the reversing gear unit of FIGURE 3, which is one example of the various types of reversing gear units—planetary, epicyclic or otherwise—that might be used.

PARTICULAR DESCRIPTION OF THE INVENTION

Figure 1A:
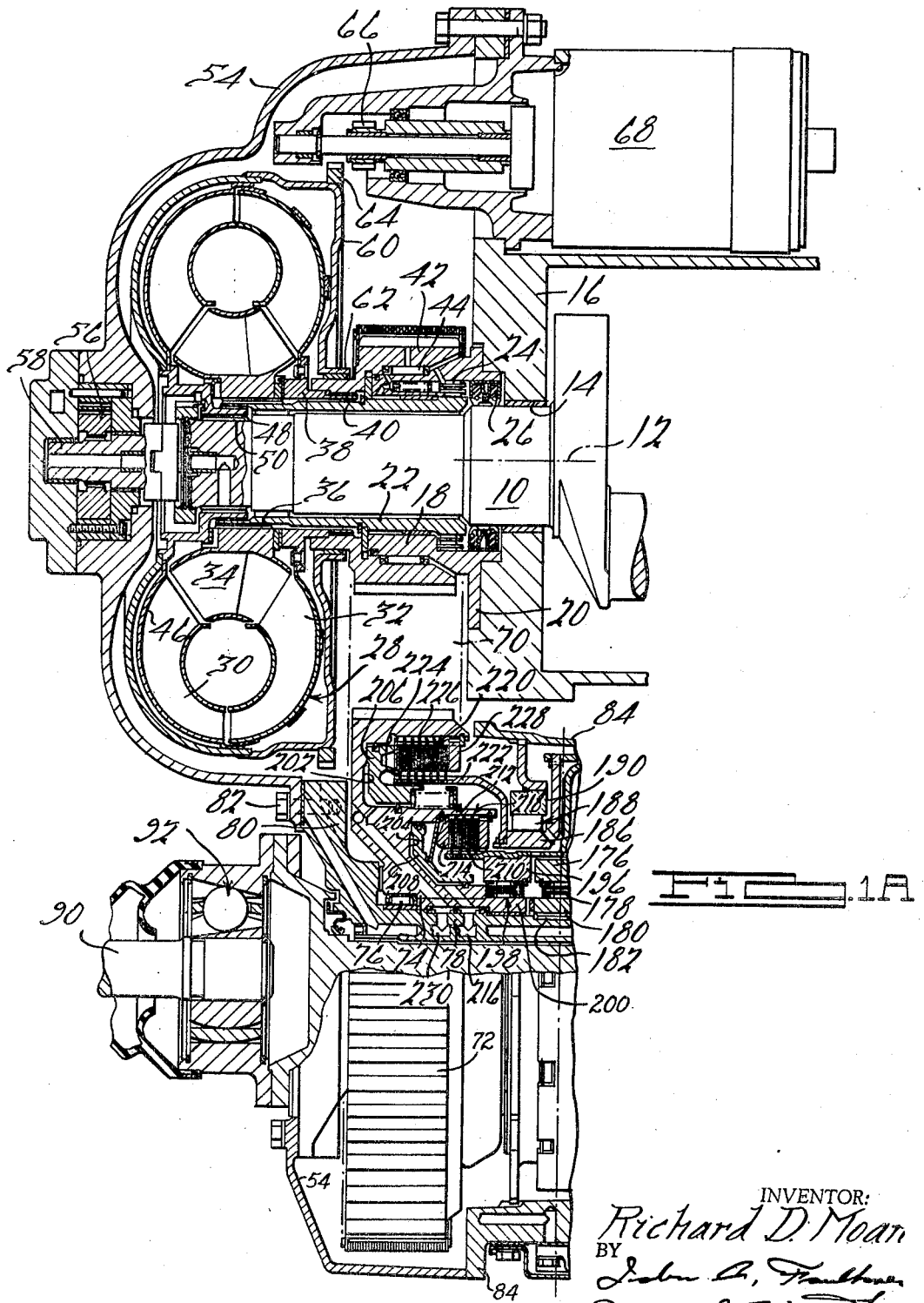
FIGURE 1A shows the hydrokinetic portion of the driveline as well as a portion of the vehicle engine.

In FIGURE 1A numeral 10 indicates a portion of the crankshaft of an internal combustion engine. It is journalled for rotation about crankshaft axis 12 within bearing opening 14 formed in wall 16 of the housing for the internal combustion engine. Stationary sleeve shaft 18 is bolted or otherwise secured directly to wall 16, flange 20 being provided for this purpose. Stator sleeve shaft 22 is journalled for rotation about the end of crankshaft 10. An overrunning brake 24, preferably in the form of sprags or rollers, inhibits backward rotation of the sleeve shaft 22 with respect to the housing 16 in one direction, although it permits freewheeling motion in the opposite direction. Rotary shaft seal 26 seals the opening for the crankshaft.

A hydrokinetic torque converter is shown at 28. It includes a bladed impeller 30, a bladed turbine 32 and a bladed stator 34. The stator is splined at its hub to the sleeve shaft 22, as shown at 36. The turbine includes an outer shroud that is connected drivably to the turbine hub 38. This in turn is splined at 40 to a toothed sprocket wheel 42 which is journalled by bearing 44 on the stationary sleeve 18.

The impeller includes an outer shroud 46, which is connected drivably to an impeller hub 48. This is splined at 50 to the left-hand end of the crankshaft 10.

The housing for the engine has secured thereto a bell housing 54 which encloses the torque converter 28. The left-hand end of the housing 54 encloses a positive displacement pump 56, which has a rotor splined to a rotor drive shaft 58 keyed to the end of the crankshaft 10. The pump 56 forms a hydrostatic pressure source for the control system which engages and releases the servos for the clutches and brakes of the construction shown in FIGURE 1B.

The impeller shell 60, which encloses the turbine, is journalled at its hub 62 on the sprocket wheel 42. The periphery of the shell 60 carries a starter ring gear 64 which meshes with a starter motor pinion 66 for the engine's electric starter motor 68.

Torque is transferred to the torque delivery mechanism of FIGURE 1B through a drive chain 70, which is trained over and which engages drivebly the sprocket wheel 42.

Drive chain 70 engages an externally toothed sprocket wheel 72, which has a hub 74 journalled by means of bearing 76 on a stationary sleeve shaft extension 78. This extension has a flange 80 that is secured by bolts 82 to the housing 54. The driven portions of the driveline include a pair of driven shafts, as shown at 86 and 88. Shaft 88 extends through the sleeve shaft extension 78 and through housing 54 and is connected drivably to a left-hand output shaft 90 by the universal joint coupling 92. Driven shaft 86 is connected to a right-hand output shaft 94 by means of the universal joint coupling 96.

The gearing of FIGURE 1B includes a simple planetary gear unit 98 and a compound planetary gear unit or reversing gear unit 100. Gear unit 98 includes a sun gear 102, planet pinions 104 journalled rotatably on pinion shaft 106 carried by carrier 108, and a ring gear 110. Brake discs 112 of a multiple disc brake assembly 114 are splined to the outer periphery of the ring gear 110. Separator plates 116 are splined to the interior of the housing 84. The housing 84 is formed with an annular cylinder 118 within which is positioned an annular piston 120. The piston and cylinder cooperate to define a pressure chamber 122 which, when pressurized, applies force through Belleville spring 124 to pressure plate 126. This in turn causes the brake discs and the separator plates to become connected frictionally, the reaction force being taken by a reaction ring 128.

Sun gear 102 is connected directly to sun gear 124 of the planetary gear unit 100. It engages drivably a first set of planet pinions 126 journalled rotatably on carrier 128. These mesh with a second set of planetary pinions, as shown in phantom lines, which in turn engage drivably ring gear 130. This ring gear is carried by a clutch drum 132 which is formed with a hub 134. The stationary sleeve shaft 78 journals the hub 134.

Annular cylinder 136 formed in the drum 132 receives an annular piston 138. Pressure chamber 140 located behind the piston 138 is in fluid communication with a pressure feed passage 142.

Carrier 128 is formed with an externally splined clutch element 144 which carries clutch discs 146 of a multiple disc clutch assembly 148. Companion separator plates are carried by the splined inner periphery of the drum 132. The ring gear 130 may serve as a back-up ring for the clutch plates. Piston 138 drivably engages the clutch plates and the separator plates as pressure is admitted to the chamber 140. Piston return spring 150 situated between spring seat 152 and piston 138 disengages the clutch as the chamber 140 is exhausted.

A companion multiple disc brake assembly 154 comprises a clutch element 156 on which are splined disc 158. These register with separator plates 160 carried by the splined inner periphery of the drum 132. Drum 132 defines an annular cylinder 162 which receives an annular piston 164. A working chamber 166 is situated behind the piston 164 and it is in fluid communication with the feed passage 168. Both passage 168 and the passage 142 are formed in the sleeve shaft 78.

When the chamber 166 is pressurized, the resulting pressure force is distributed through annular Belleville spring 170 to pressure ring 172 which engages the brake.

Brake 154 includes a back-up ring 174 which has a hub 176 defining an outer race for an overrunning brake 178. The inner race for the overrunning brake comprises a hub 180 which forms a part of the brake element 156. Relative motion of the recess 176 and 178 is permitted in one direction, but race 176 is prevented from rotating in the opposite direction. Element 180 is splined at 182 to the stationary sleeve shaft 178. Ring gear 110 is connected drivably to a torque transfer member in the form of a drum 184.

Drum 184 encircles the gear unit 100 and is connected at its left-hand end to inner race 186 for an overrunning brake 188. The outer race 190 for the overrunning brake is connected directly to the housing 84. A second torque transfer element in the form of a drum 192 encircles the gear unit 100. It is surrounded by the drum 184. The right-hand end of the drum 192 is connected drivably to the carrier 128. Its left-hand end is connected to cylindrical member 194 to which is drivably connected the outer race 196 of an overrunning clutch 198. The inner race for the clutch 198 comprises a sleeve extension 200 of the drive wheel 72. Torque can be transferred to the drive wheel 72 from the drum 192, but torque delivery in the opposite direction is not possible.

A drive wheel 72 defines a pair of radially-spaced annular cylinders 202 and 204. Annular piston 206 is located in cylinder 202, and annular piston 208 is located in the cylinder 204. Cylindrical member 194 carries external clutch discs 210 which register with separator plates 212 carried by the splined inner periphery of the cylinder 204. The discs 210 and the plates 212 are frictionally engaged as pressure is distributed to pressure ring 214 by the piston 208. Fluid pressure is admitted to the working chamber behind the piston 208 through pressure feed passage 216 formed in the sleeve shaft 78. The clutch assembly, shown in part at 210, is identified by reference character 218. When clutch 218 is applied, a driving connection is established between the wheel 72 and the drum 192.

Another multiple disc clutch assembly, shown at 220, includes a clutch element 222 which carries clutch discs 224. These are situated adjacent separator plates 226 carried by the splined inner periphery of the cylinder 202. When fluid pressure is admitted to the chamber behind the piston 206, the discs 224 and the plates 226 establish a driving connection between the wheel 72 and the clutch element 222, which is connected directly to the inner race 186. A back-up reaction ring 228 provides a force reaction point for the piston force. The fluid feed passage for the clutch 220 is shown in part at 230. It also is located in the sleeve shaft 78.

Carrier 108 for the gear unit 98 is connected directly to differential carrier 232 of a differential gear unit 234. Differential side gears 236 and 238 are located within the carrier 232. Side gear 236 is splined directly to the output shaft 86. A hub 240 formed on the carrier 232 is journalled rotatably in a bearing opening 242 formed in the right-hand end of the transmission housing 84. A corresponding carrier hub 244 is journalled rotatably in bearing opening 246 formed in sun gear 102.

Differential pinions 248 and 250 mesh directly with the side gears 236 and 238. They are journalled on pinion shafts 252 and 254, respectively. These shafts in turn are carried by the carrier 232.

The carrier is formed with a ring gear 256 which meshes drivably with a governor drive gear 258. This gear in turn is carried by a governor assembly 260 which is journalled rotatably in a bearing opening 262 formed in the right-hand end of the housing 84. Governor 260 provides a fluid pressure servo that is an indicator of the driven speed of the carrier 232.

The speed signal developed by the governor 260 is used by an automatic control valve system not shown, together with an engine torque demand signal to control the ratio shifts.

To establish low-speed, forward-drive operation the clutch 218 is applied. Turbine torque developed by the torque converter 28 is distributed through the wheel 42 and through the drive chain 70. Chain 70 drives the sprocket wheel 72 which in turn drives carrier 128 through the engaged clutch 218 and through the clutch drum 192. Multiple disc clutch 148 also is applied thereby connecting the carrier 128 to the ring gear 130. Torque then is delivered directly through the planetary gear unit 100 to the sun gear 102 of the right-hand gear unit 98. Ring gear 110 is anchored against the stationary housing by brake 188. Carrier 108 serves as the output member as it drives differential carrier 232 and each of the shafts 86 and 88.

To initiate a change from the low speed ratio to the second underdrive ratio, clutch 148 is disengaged and brake 154 is applied. Also clutch 220 is applied. Torque then is delivered directly through clutch 220 to the ring gear 110 through the torque transfer member 184. Torque is delivered also through the clutch 218 to the carrier 128. Since brake 154 is applied, the ring gear 130 becomes a reaction member. It is anchored against rotation by the overrunning brake 178. A split torque delivery path now is established as the sun gear 124 moves in a direction wheel 72 with torque being delivered to both the ring gear 110 and the sun gear 102 through parallel torque delivery paths. The resultant motion of the output carrier 108 occurs with an increased speed ratio.

To establish the third underdrive speed ratio, it merely is necessary to anchor the sun gear 102. This is done by engaging the clutch 148, which again locks up the left-hand planetary gear unit 100. At the same time clutch 218 is released. Thus the ring gear 110 becomes a sole power input element and the sun gear 102 becomes the reaction element. The reaction torque of the sun gear 102 is distributed through the left-hand gear unit 100 and through engaged brake 154 to the transmission housing.

Fourth speed-ratio is a direct drive ratio. This is accomplished by engaging simultaneously clutches 220 and 148 while the other clutches are released. All of the elements of the gearing thus rotate in unison with the power input sprocket wheel 72.

For the purpose of clarifying the description of the torque delivery paths, the following formulae for the torque ratio in each driving condition are set forth:

$$\text{1st ratio} = 1 + \frac{R2}{S2} \qquad \text{2nd ratio} = \frac{1 + \frac{R2}{S2}}{\frac{R2}{S2} - \frac{R1}{S1} + 1}$$

$$\text{3rd ratio} = 1 + \frac{S2}{R2} \qquad \text{Rev.} = \frac{1}{1 - \frac{R1}{S1}}\left(1 + \frac{R2}{S2}\right)$$

The overrunning brake 178 is used to simplify the control sequence during ratio changes between the lowest speed ratio and the second speed ratio as well as between the third speed ratio and the fourth speed ratio. For example, on a 1–2 upshift brake 154 can be applied following the engagement of the clutch 220. The timing is not critical since the overrunning brake 178 will accommodate the necessary torque reaction of the ring gear 130 until the full capacity of the brake 154 is established. On a 3–4 upshift, the brake 154 can be disengaged before the clutch 148 is applied. Again timing is no problem since the overrunning brake 178 is capable of accommodating the torque reaction during the shift interval.

On a 2–3 upshift the overrunning clutch 198 eliminates the timing problems since clutch 218 can be released during the initial stages of the shift interval before clutch 148 becomes applied. To avoid a torque delivery interruption, the overrunning clutch 198 will deliver the necessary torque to the carrier 128 until the third speed ratio condition is fully established.

In FIGURE 3 I have shown an alternate embodiment for the gearing shown in FIGURE 1B. It functions in a manner similar to the FIGURE 1B construction, although an alternate lock-up clutch for the reversing gear set has been used. The elements of the FIGURE 3 construction that are common to the FIGURE 1B construction have been designated by similar reference characters, although prime notations have been added.

In the FIGURE 3 embodiment, during first speed ratio operation, clutch 148' delivers torque directly to the right-hand sun gear 102'. The over-all ratio, however, is unchanged with respect to the FIGURE 1B construction regardless of whether torque is delivered directly to the sun gear 102' or through the locked-up planetary gear elements of the gear unit 100.

During forward-drive, second speed ratio operation, torque is delivered simultaneously to the ring gear 110' and to the sun gear 124'. It differs from the FIGURE 1B construction in this respect since in the FIGURE 1B construction the carrier for the left-hand planetary gear unit will be driven while the carrier 128' of the FIGURE 3 construction rotates in a reverse direction as does the sun gear 124 of the FIGURE 1B construction during second speed ratio operation. This reverse motion on the part of the sun gear 102' produces an output motion for the carrier 108' at the second speed ratio.

Third speed ratio is accomplished in the FIGURE 3 construction in a manner similar to the FIGURE 1B construction. In both constructions the sun gear is anchored to the housing through the locked-up reversing gear set.

Reverse is achieved in the FIGURE 1B construction by engaging simultaneously brake 114, clutch 218 and brake 154. The ring gear 130 for the reversing gear unit now acts as a reaction member, and the sun gear 124 is driven in a reverse direction at a reduced ratio. This ratio results in reverse motion of the sun gear 102. The torque then is multiplied again by the simple planetary gear unit 98 to produce an increased reverse ratio. The reverse torque ratio achieved in this manner is desirably higher than that which can be achieved with conventional drivelines with planetary gear elements.

Reverse drive in the FIGURE 3 construction is obtained as the carrier 128' is driven in reverse direction which in turn drives the sun gear 102' in a reverse direction with the ring gear 110' acting as a reaction member.

Having thus described a preferred form of my invention, what I claim and desire to secure by U.S. Letters Patent is:

1. An automotive vehicle driveline adapted to deliver driving torque from an engine to a vehicle traction wheel, a simple planetary gear unit and a reversing planetary gear unit defining in part plural torque delivery paths between said engine and a driven shaft, said traction wheel being connected drivably to said driven shaft, said simple planetary gear unit including a sun gear, a ring gear, planetary pinions drivably engaging said gears and a carrier journalling said pinions, said driven shaft being operatively connected to said carrier, said reversing gear unit comprising a reaction gear, a power output gear element and a power input gear element, said gear elements being geared to said reaction gear and to each other, one of said gear elements being connected to the sun gear of said simple planetary gear unit, a power input member connected drivably to said engine, first clutch means for connecting selectively said power input member to the ring gear of said simple planetary gear unit, second clutch means for connecting selectively said power input member to said power input gear element of said reversing gear unit, first brake means for anchoring said reaction gear of said reversing gear unit against a stationary portion of said driveline and second brake means for anchoring selectively the ring gear of said simple planetary gear unit during low speed ratio operation and third clutch means for connecting together for rotation in unison the gear elements of said reversing gear unit during low speed ratio operation, third speed-ratio operation and direct drive fourth speed-ratio operation, said first clutch means being engaged during second, third and fourth speed-ratio operation and said second clutch means being engaged during first and second ratio operation and during reverse drive, both of said brake means being engaged during reverse drive.

2. The combination as set forth in claim 1 wherein said second clutch means comprises a selectively engageable friction torque clutch adapted to connect drivably said power input member and said power input element of said reversing gear unit and an overruning coupling situated in parallel disposition with respect to said second clutch means for establishing a one-way driving torque delivery path between said power input member and said power input element of said reversing gear unit.

3. The combination as set forth in claim 2 wherein said first brake means comprises a selectively engageable friction brake having elements connected to said stationary portion and to said reaction gear and adapted to anchor said reaction gear selectively to said stationary portion, and an overrunning brake situated in parallel disposition with respect to said first brake means for establishing a one-way torque delivery path between said reaction gear and said stationary portion.

4. The combination as set forth in claim 1 wherein said reversing gear unit comprises a ring gear, a sun gear, a first set of planet pinions engaging said ring gear, a second set of planet pinions engaging the sun gear, said planet pinions engaging each other, a common carrier rotatably supporting said planet pinions, said power input gear element of said reversing gear unit comprising the carrier of said reversing gear unit and said power output element of said reversing element comprising the sun gear of said reversing gear unit.

5. The combination as set forth in claim 2 wherein said reversing gear unit comprises a ring gear, a sun gear, a first set of planet pinions engaging said ring gear, a second set of planet pinions engaging the sun gear, said planet pinions engaging each other, a common carrier rotatably supporting said planet pinions, said power input gear element of said reversing gear unit comprising the carrier of said reversing gear unit and said power output element of said reversing element comprising the sun gear of said reversing gear unit.

6. The combination as set forth in claim 3 wherein said reversing gear unit comprises a ring gear, a sun gear, a first set of planet pinions engaging said ring gear, a second set of planet pinions engaging the sun gear, said planet pinions engaging each other, a common carrier rotatably supporting said planet pinions, said power input gear element of said reversing gear unit comprising the carrier of said reversing gear unit and said power output element of said reversing element comprising the sun gear of said reversing gear unit.

7. The combination as set forth in claim 1 wherein the driving connection between said engine and said power output member comprises a hydrokinetic torque converter having an impeller connected to said engine and a turbine situated in toroidal fluid flow relationship with respect to said impeller, the axis of said converter being spaced from and parallel to the axis of said power output shaft, a first sprocket wheel connected drivably to said turbine and situated for rotation about the axis of said turbine, said power input member comprising a second sprocket wheel mounted for rotation about the axis of said output member, and a drive chain conecting said sprockets.

8. The combination as set forth in claim 2 wherein the driving connection between said engine and said power output member comprises a hydrokinetic torque converter having an impeller connected to said engine and a turbine situated in toroidal fluid flow relationship with respect to said impeller, the axis of said converter being spaced from and parallel to the axis of said power output shaft, a first sprocket wheel connected drivably to said turbine and situated for rotation about the axis of said turbine, said power input member comprising a second sprocket wheeel mounted for rotation about the axis of said output member, and a drive chain connecting said sprockets.

9. The combination as set forth in claim 3 wherein the driving connection between said engine and said power output member comprises a hydrokinetic torque converter having an impeller connected to said engine and a turbine situated in toroidal fluid flow relationship with respect to said impeller, the axis of said converter being spaced from and parallel to the axis of said power output shaft, a first sprocket wheel connected driveably to said turbine and situated for rotation about the axis of said turbine, said power input member comprising a second sprocket wheel mounted for rotationabout the axis of said output member, and a drive chain connecting said sprockets.

10. The combination as set forth in claim 4 wherein the driving connection between said engine and said power output member comprises a hydrokinetic torque converter having an impeller connected to said engine and a turbine situated in toroidal fluid flow relationship with respect to said impeller, the axis of said converter being spaced from and parallel to the axis of said power output shaft, a first sprocket wheel connected drivably to said turbine and situated for rotation about the axis of said turbine, said power input member comprising a second sprocket wheel mounted for rotation about the axis of said output member, and a drive chain connecting said sprockets.

11. The combination as set forth in claim 5 wherein the driving connection between said engine and said power output member comprises a hydrokinetic torque converter having an impeller connected to said engine and a turbine situated in toroidal fluid flow relationship with respect to said impeller, the axis of said converter being spaced from and parallel to the axis of said power output shaft, a first sprocket wheel connected drivably to said turbine and situated for rotation about the axis of said turbine, said power input member comprising a second sprocket wheel mounted for rotation about the axis of said output member, and a drive chain connecting said sprockets.

12. The combination as set forth in claim 6 wherein the said power output member comprises a differential carrier, differential pinions carried by said differential carrier, side gears engaging said differential pinions, a pair of torque delivery shafts, one torque delivery shaft being connected to each side gear, one of said torque delivery shafts extending coaxially through said simple planetary unit and said reversing gear unit.

13. The combination as set forth in claim 7 wherein the said power output member comprises a differential carrier, differential pinions carried by said differential carrier, side gears engaging said differential pinions, a pair of torque delivery shafts, one torque delivery shaft being connected to each side gear, one of said torque delivery shafts extending coaxially through said simple planetary unit and said reversing gear unit.

14. The combination as set forth in claim 8 wherein the said power output member comprises a differential carrier, differential pinions carried by said differential carrier, side gears engaging said differential pinions, a pair of torque delivery shafts, one torque delivery shaft being connected to each side gear, one of said torque delivery shafts extending coaxially through said simple planetary unit and said reversing gear unit.

15. The combination as set forth in claim 9 wherein the said power output member comprises a differential carrier, differential pinions carried by said differential carrier, side gears engaging said differential pinions, a pair of torque delivery shafts, one torque delivery shaft being connected to each side gear, one of said torque delivery shafts extending coaxially through said simple planetary unit and said reversing gear unit.

16. The combination as set forth in claim 10 wherein the said power output member comprises a differential carrier, differential pinions carried by said differential carrier, side gears engaging said differential pinions, a pair of torque delivery shafts, one torque delivery shaft being connected to each side gear, one of said torque delivery shafts extending coaxially through said simple planetary unit and said reversing gear unit.

References Cited

UNITED STATES PATENTS

| | | | |
|---|---|---|---|
| 2,395,459 | 2/1946 | Carnagua | 74—759 |
| 2,749,777 | 6/1956 | Simpson | 74—761 |
| 2,775,144 | 12/1956 | Kelbel | 74—769 |
| 2,813,437 | 11/1957 | Kelbel et al. | 74—759 |
| 3,090,256 | 5/1963 | Hause | 74—759 X |
| 3,173,310 | 3/1965 | Moan | 74—688 |

DONLEY J. STOCKING, Primary Examiner

THOMAS C. PERRY, Assistant Examiner

U.S. Cl. X.R.

74—695, 730, 769